United States Patent
Dir

[11] 4,002,404
[45] Jan. 11, 1977

[54] IMAGING SYSTEM WITH LATENT ALIGNMENT IMAGE

[75] Inventor: Gary A. Dir, Fairport, N.Y.

[73] Assignee: Xerox Corporation, Stamford, Conn.

[22] Filed: Jan. 7, 1975

[21] Appl. No.: 539,146

[52] U.S. Cl. .................................. 350/160 LC
[51] Int. Cl.² ............................... G02F 1/16
[58] Field of Search ...................... 350/160 LC

[56] References Cited
OTHER PUBLICATIONS

Janning, J. L., "Thin Film Surface Orientation for Liquid Crystals" Appl. Phys. Lett., vol. 21, No. 4 Aug. 15, 1972.

*Primary Examiner*—John K. Corbin
*Assistant Examiner*—Rolf Hille
*Attorney, Agent, or Firm*—James J. Ralabate; Michael H. Shanahan; George J. Cannon

[57] ABSTRACT

Substrates treated in the conventional manner for aligning molecules of liquid crystalline compositions are imagewise altered to form a latent alignment image which is subsequently developed with a liquid crystalline composition.

22 Claims, 6 Drawing Figures

IMAGING SYSTEM WITH LATENT ALIGNMENT IMAGE

BACKGROUND OF THE INVENTION

The invention herein described was made in the course of or under a contract with the United States Government.

This invention relates to imaging with liquid crystalline compositions; more particularly, this invention relates to the creation of a latent alignment image and the development thereof with liquid crystalline compositions.

It is well known in the liquid crystalline art that treated surfaces of substrates align molecules of liquid crystalline compositions. Heretofore, this property has been utilized exclusively for substantially uniformly aligning the molecules of a liquid crystalline composition in a single predetermined direction.

Aligning agents known in the art include those which can be added to the liquid crystalline composition such as those disclosed in U.S. Pat. No. 3,656,834 and in U.S. Pat. No. 3,803,050.

Aligning agents also include those which are typically coated upon substrates to influence the alignment of molecules of a layer of liquid crystalline composition subsequently coated upon the alignment coating. Known coating alignment materials include, for example, silanes such as alkoxysilanes for homeotropic alignment and additive and coating materials listed in Volume 61, No. 7, *Proceedings of the IEEE*, page 828, July, 1973, in the article "Surface-Produced Alignment of Liquid Crystals" by Kahn, Taylor and Schonhorn, for both homeotropic and homogeneous alignment.

Homogeneous alignment can be accomplished by rubbing the substrate and is known in the art as the "Chatelain technique". See, for example, P. Chatelain, *Bull. Soc. Fr. Miner. Crist.*, 66, 105 (1943).

Homeotropic alignment can be accomplished by the Jannings technique reported in Vol. 21, No. 4 of the *Journal of Applied Physics* cited infra.

As previously stated, heretofore, these treated substrates have been utilized to align the molecules of the liquid crystalline compositions in order to provide a first state of molecular alignment. This first state of molecular alignment provided by the treated substrate has heretofore been changed by external stimuli acting upon the liquid crystalline composition such as, for example, electrical fields, vapor, or heat.

In new and growing areas of technology, new methods, apparatus, compositions, and articles of manufacture are often discovered for the new application of the new technology in a new mode. The present invention relates to a new and advantageous imaging system wherein the treated substrate is imagewise altered prior to contact with a liquid crystalline composition.

SUMMARY OF THE INVENTION

It is, therefore, an object of the invention to provide a novel imaging system.

It is another object of this invention to provide a novel latent image.

It is still a further object of this invention to provide a method for imaging liquid crystalline compositions without resort to the external application of magnetic or electrical fields, heat, or vapor.

It is still yet a further object of this invention to provide a novel liquid crystalline display.

Another object of this invention is to provide an electro-optic cell which contains permanent, constant, or non-changing information in one portion thereof which has an area wherein constantly changing information can be displayed.

The foregoing objects and others are accomplished in accordance with this invention by providing a treated substrate capable of aligning the molecules of a liquid crystalline composition; forming a latent alignment image on said treated substrate; and, developing said latent alignment image with a liquid crystalline composition.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof, wherein.

DESCRIPTION OF THE PREFERRED EMBODIMENTS

FIG. 1 schematically illustrates the formation of a latent alignment image and the development thereof by contacting the latent alignment image with a liquid crystalline composition.

Figure 1A:
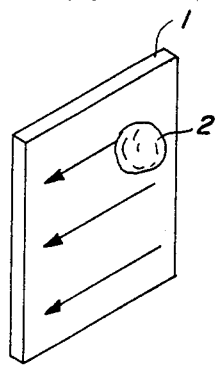
FIG. 1A through 1D a schematic illustration of an exemplary method of forming and developing a latent alignment image in accordance with the practice of this invention.
Figure 1B:
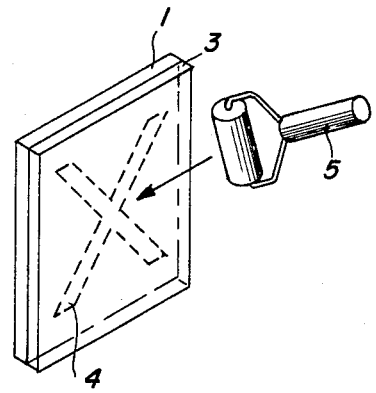
Figure 1C:
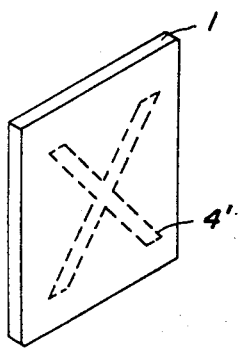
Figure 1D:
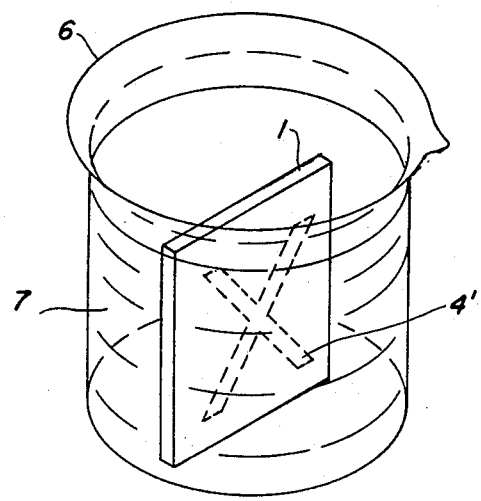

FIG. 1A schematically depicts the step of providing a treated substrate. FIG. 1B schematically illustrates the step of forming a latent alignment image. FIG. 1C schematically illustrates a latent alignment image on a substrate. FIG. 1D schematically illustrates the step of developing the latent alignment image. It will be understood that each of these schematically illustrated steps are for purposes of illustration only and that each of the steps are capable of being performed in other manners and with various materials as hereinbelow described.

Referring now to FIG. 1A, there is seen a substrate 1 being subjected to a treatment which will render the surface so treated capable of aligning molecules of a liquid crystalline composition. The treatment depicted in FIG. 1A is the "Chatelain technique" of rubbing a substrate in one direction. Any suitable substrate can be employed in the practice of the present invention. Classically, the "Chatelain technique" is employed with a glass substrate. However, any material can be employed as long as it is compatible with the treatment utilized to provide it with the capability of aligning the molecules of a liquid crystalline composition. Typical suitable substrates include, for example, glass, cellulose acetate, cellulose triacetate, cellulose acetate butyrate, polyurethane elastomers, polyethylene, polypropylene, polyesters, polystyrene, polycarbonates, polyvinyl fluorides, polytetrafluoroethylene, polyethylene terephthalate, and mixtures thereof. The substrates are preferably chemically inert, transparent, not birefringent, substantially insulating, and have dielectric characteristics appropriate to the utilization of electrical fields or electrical current in embodiments such as that in FIG. 4 where electrical fields or electrical current can be utilized in conjunction with the advantageous novel imaging of the present invention.

Any suitable method of treating the substrate 1 can be employed in accordance with the practice of this invention in order to impart substrate 1 the capability of aligning molecules of liquid crystalline compositions with which it is connected. Typical suitable aligning agents which can be coated upon the substrate 1 in order to provide a treated substrate capable of aligning the molecules of liquid crystalline compositions are well known to those skilled in the art. Such typical suitable aligning agents include, for example, those which provide homogeneous alignment to nematic liquid crystalline materials and include those which provide homeotropic alignment to nematic liquid crystalline materials.

Typical suitable aligning agents which provide homogeneous alignment to nematic liquid crystalline materials include, for example, silanes such as the alkoxysilane N-methyl3-aminopropyltrimethoxysilane, and amorphous carbon.

Typical suitable aligning agents providing homeotropic alignment to nematic liquid crystalline materials include, for example, lecithin; tetraethyl ammonium chloride; N,N-dimethyl-N-octadecyl-3-aminopropyltrimethoxysilyl chloride and polyamide resins available for General Mills, Inc. under the trademark Versamid. Other suitable substrate treatments include, for example, the angular deposition of materials such as gold or silicon monoxide, onto selected clean substrates as described in "Thin Film Surface Orientation for Liquid Crystals", *J. Appl. Phys. Letter*, Vol. 21, No. 4, Aug. 15, 1972. Other materials capable for use in the angular deposition method of the aforementioned article include chromium, platinum, and aluminum.

Referring now to FIG. 1B, there is seen the schematic illustration of the step of creating a latent alignment image. By the phrase "latent alignment image" is herein meant a latent image on the treated substrate which is capable of aligning the molecules of a liquid crystalline composition in a direction different from the direction to which the treated substrate is capable of aligning the molecules of the liquid crystalline composition. Depicted in FIG. 1B is an exemplary method of creating a latent alignment image. A support bearing a relief image 4 is placed in contact with the treated substrate such that the relief image is in contact with the treated surface of the substrate. Pressure is applied to the relief image support 3 such as, for example, by a pressure roller 5. This ensures intimate contact between the relief image 4 and the treated surface of substrate 1. After intimate contact is ensured, relief image support 3 is detached from substrate 1. Upon separation of substrate 1 from support 3, it has been found that the treated surface of substrate 1 bears a latent image 4' corresponding in configuration to the relief image 4. While the mechanism of creating the latent alignment image in the pressure case is not clearly understood, no transfer of material from the relief image to the surface of substrate 1 was detected and it is theorized that the pressure caused a change in the orientation of the matter in the treated surface of substrate 1 in imagewise configuration.

Means other than depicted in FIG. 1B for creating a latent alignment image can be employed. Generally speaking, means which chemically change the treated surface of substrate 1 as well as the selective, imagewise deposition of a material different from the treated surface of substrate 1 or the aligning agent coating upon substrate 1 can be employed in addition to the aforementioned change in orientation of material in or on the treated surface of substrate 1. For example, high local heating of an image in contact with the treated surface of substrate 1 can be employed. This is conveniently carried out by contacting the treated surface of substrate 1 with a xerographic copy, for example, toner side in contact with the treated surface, and irradiating the backside of the xerographic copy with a high intensity flash of a Xenon lamp. Upon separation of the substrate 1 and the xerographic copy in contact therewith, a latent alignment image is found on the treated surface of substrate 1. As an example of chemically changing the treated surface of substrate 1, more particularly chemically changing the aligning agent coated upon substrate 1, a coating of Versamid is reacted with epoxy resin in imagewise configuration to create a latent alignment image. This can be conveniently carried out by contacting the Versamid coating on substrate 1 with epoxy resin through a mask.

It will be appreciated, of course, that the foregoing is merely illustrative of general ways in which a latent alignment can be created on a treated substrate. The specific methods previously recited are intended to be merely illustrative of the surprising, exciting and unexpected discovery that a substrate treated to align the molecules of a liquid crystalline composition substantially in a single direction can be imagewise modified to imagewise align the molecules on a second direction. It has been found through experimentation that the advantageous imaging system of the present invention is extremely sensitive and will detect differences between image and background areas which are not detectable by the deposition of water vapor thereon and which are not detectable by the naked eye. The broad thrust of this invention, therefore, is the imagewise modification of any treated substrate such that upon contact with a liquid crystalline composition the background areas of the treated surface of the substrate align the molecules of the liquid crystalline composition in one direction and the imagewise modified area of the treated surface of the substrate aligns the molecules of a liquid crystalline composition in a second direction.

Accordingly, it will be understood that any liquid crystalline composition can be employed in the practice of the advantageous imaging system of the present invention. Such liquid crystalline materials include, for example, cholesteric liquid crystalline materials; nematic liquid crystalline materials; smectic liquid crystalline materials and mixtures thereof. Specific compounds which are classified as cholesteric, nematic or smectic liquid crystalline materials are well known to those skilled in the art and, therefore, will not be set forth herein. Further, nematic materials on a substrate treated to give homogeneous alignment to nematic liquid crystalline materials can be utilized in the twisted nematic structure. It is sufficient for an understanding of the present invention that all of these materials exhibit optical properties which depend upon the orientation of the molecules thereof relative to the direction of light impinging such materials and relative to the viewing direction of an observer or detection device. Nematic liquid crystalline materials are preferred in the practice of the present invention because of the relative simplicity of the molecular orientation of such materials when in contact with a treated substrate. That is, the molecules of a nematic liquid crystalline material typically all align in substantially the same direction when in contact with a treated substrate. This direction of alignment can, as known to those skilled in the art, be either the homeotropic alignment, the homogeneous alignment or an intermediate alignment direction. Generally speaking, the homeotropic alignment of a nematic liquid crystalline material is one in which the major axes of the molecules are parallel to one another and perpendicular to the plane of the treated surface of the substrate; simiarly, the homogeneous alignment of the molecules of the nematic liquid crystalline materials is one in which the major axes of the molecules are parallel to one another and parallel to the plane of the treated surface of the substrate.

The molecular structures of the smectic and cholesteric liquid crystalline materials are well known in the liquid crystal art, for example, the smectic mesophase is typically structurally described as having its molecules arranged in layers with the major axes of the molecules approximately parallel to each other and approximately normal to the planes of the layers. Within a given layer, the molecules in the smectic mesophase may be organized in uniform rows randomly distributed throughout the layer. The layers of the smectic mesophase are free to move in relation to each other because the attractive forces between the layers are relatively weak, thereby providing the smectic liquid crystalline substances with the mechanical properties of a planar or 2-dimensional, soap-like fluid.

Cholesteric liquid crystalline materials are typically described in the literature as having molecules believed to be arranged in definite layers as in the smectic mesophase; however, within a given layer, molecules believed to be arranged with their major axes approximately parallel in a fashion resembling the structure of nematic liquid crystals. The cholesteric structure derives its name from the fact that the materials exhibiting the cholesteric liquid crystalline structure typically have molecules which are derivatives of cholesterol and which are shaped very similarly to molecules of cholesterol. Because of the shape of the cholesteric molecule, in the cholesteric structure the direction of the major axes of the molecules in each of the aforementioned thin layers is displaced slightly from the major molecular axis in the adjacent molecular layers. When compared to a hypothetical straight line axis passing through a cholesteric liquid crystalline substance and perpendicular to the molecular planes within each adjacent molecular layer traces out a helical path around the hypothetical straight line axis.

To observe the latent alignment image the treated surface of substrate 1 bearing the latent alignment image is placed in contact with a film of liquid crystalline composition. Preferably, the film of liquid crystalline composition has a thickness in the range of from about 1 to about 100 microns. However, even with the film of liquid crystalline composition in contact with the treated surface bearing a latent alignment image the developed latent alignment image is not detectable by the unaided human eye. Accordingly, at least one polarizer is utilized together with either an analyzer or a circular polarizer. More particularly, the developed latent alignment image is sandwiched between a polarizer and either an analyzer or circular polarizer. FIG. 1D is a schematic illustration of the step of developing the latent alignment. Depicted in FIG. 1D is a developing step wherein the treated substrate bearing a latent alignment is merely dipped into a container 6 containing liquid crystalline composition 7. Preferably, for the reasons aforementioned, liquid crystalline composition 7 is a nematic liquid crystalline composition such as, for example, p-methoxy-benzilidene-p'-n-butylaniline (MBBA). Means other than dunking the treated substrate bearing a latent alignment image into a reservoir of liquid crystalline composition can be utilized. Any suitable method of providing the substrate bearing a latent alignment image thereon with a film of liquid crystalline composition can be utilized in the practice of the present invention. Other typically suitable methods include, for example, roll coating, reverse roll coating, knifeedge coating, sliding contact coating such as bridging a coated surface into contact with the substrate and sliding said coated surface over said substrate and other means conventional to the coating art, particularly, the relatively thin film coating art.

Figure 2:
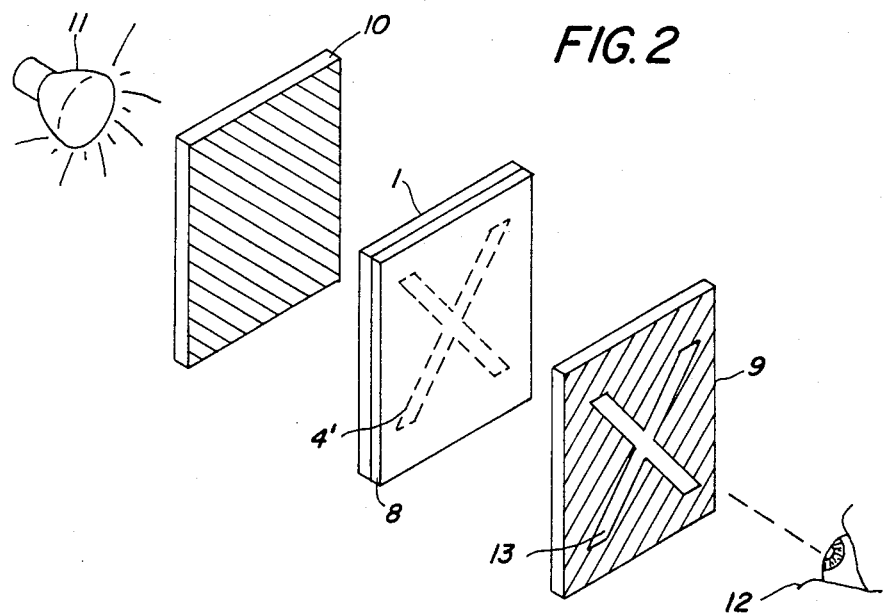
FIG. 2 is a schematic illustration of the readout of the developed latent alignment image and schematically illustrates one display embodiment of the inventive imaging system.

FIG. 2 schematically illustrates the manner in which the developed latent alignment is visibly read by the human eye. The treated substrate 1 bearing a latent alignment image 4' thereon and overcoated with a relatively thin film of nematic liquid crystalline composition is sandwiched between a polarizer 10 and an analyzer 9. Preferably, in the light transmission mode of readout depicted in FIG. 2, all of the elements are transmissive to light source 11. The orientation of the plane of polarization of polarizer 10 and that of analyzer 9, in the case of a nematic, for optimum contrast, will depend upon the alignment state of the nematic liquid crystalline material in the image and background areas. When the treated surface of substrate 1 provides a homeotropic alignment of a nematic liquid crystalline material, upon development of the latent alignment image the background area will be in the homeotropic state and the image area will be in the randomly homogeneous state. In this case visual detection of the developed latent image is observed between polarizer 10 and analyzer 9 having their respective planes of polarization forming an angle of about 90°. Any orientation of the polarizer and analyzer with respect to the molecular orientation of the molecules in film 8 can be employed and optimum contrast will be obtained. On the other hand, if the treated substrate 1 is treated to provide a homogeneous alignment of the molecules in film 8 of nematic liquid crystalline composition, then the polarizer 10 and analyzer 9 are crossed at about 90° as previously mentioned and in addition, the plane of polarization of either the polarizer 10 or analyzer 9 is aligned with, or at 90° to, the molecular orientation of the molecules of film 8 of nematic liquid crystalline composition in either the image or background area. This will provide maximum contrast.

As previously stated, film 8 is not necessarily limited to nematic liquid crystalline composition but may comprise cholesteric or smectic liquid crystalline materials or mixtures of two or more of nematic, cholesteric and smectic liquid crystalline materials. In the event that the liquid crystalline composition used to develop the latent alignment image is other than a nematic liquid crystalline material, the use of analyzer 9 or the use of a circular polarizer in lieu thereof will depend upon the state of polarization of light linearly polarized by polarizer 10 and subsequently affected by film 8.

The effect on linearly polarized light that liquid crystalline composition film 8 may have can vary from mesophase to mesophase and from mixture to mixture. However, this is of no impediment to the practice of the present invention because the linearly polarized light as modified by the film 8 will be modified in one of seven basic ways which which can be visually detected by following the procedure, known in the art as the "Stoke's technique". This technique is described in detail in the book entitled *Fundamentals of Optics* by Francis A. Jenkins and Harvey E. White, Third Edition, McGraw-Hill Book Company, Inc. (1959) in Section 27.5 entitled "Analysis of Polarized light" beginning on page 560 thereof, particularly the outlined technique on page 562 thereof. Typically, utilizing this technique one can obtain maximum contrast between image and background areas regardless of the nature of the effect that film 8 has on linearly polarized light. This maximum contrast is observed by the naked, unaided eye of observer 12 as image 13. Image 13 corresponds in configuration to latent alignment image 4'.

Figure 3:
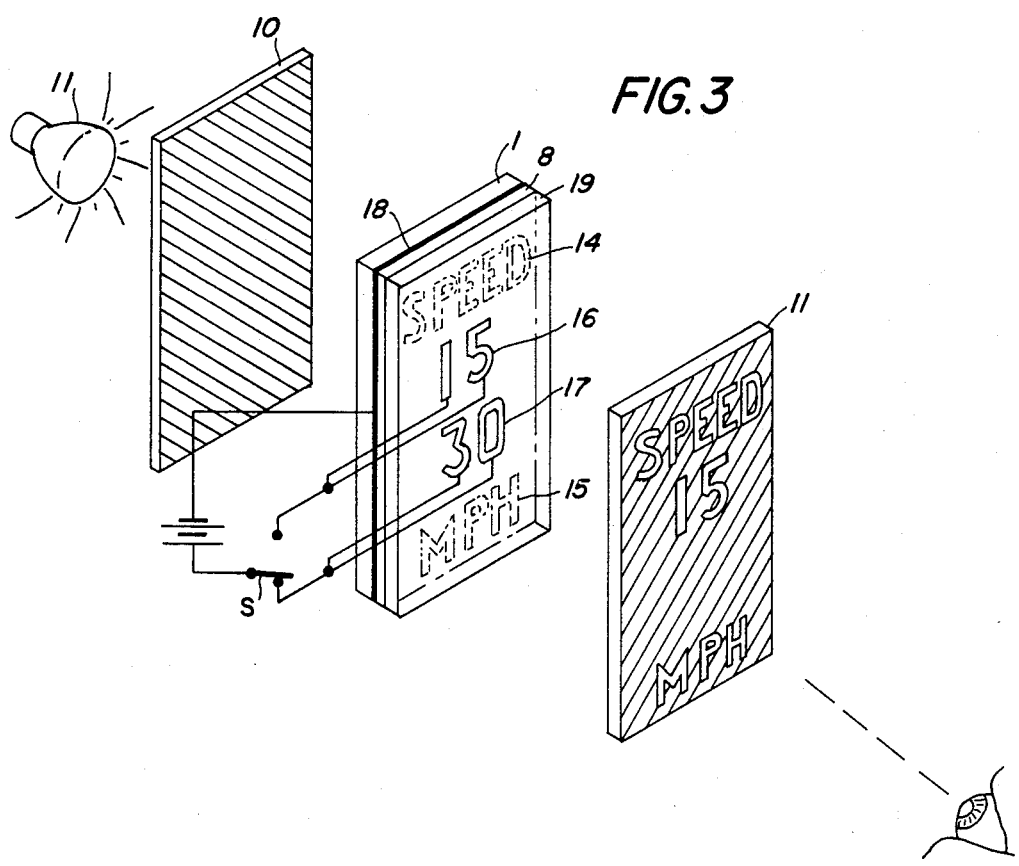
FIG. 3 is a schematic illustration of another display embodiment of the inventive imaging system in which constant information is supplemented with varying information.

It will be appreciated, of course, that the advantageous imaging system of the present invention can be utilized either in the area of marking technology or in the display technology. For example, although FIG. 2 schematically illustrates the optical visual readout of the development of a latent alignment image, it will be appreciated that the elements depicted in FIG. 2 can be arranged in a display cell and light source 11 selectively activated when the display of information is desired. This display application of the advantageous imaging system of the present invention is shown in another embodiment in FIG. 3. Referring now to FIG. 3 there is seen the same elements as previously described with respect to FIG. 2. In addition, FIG. 3 also contains electrode 18 on substrate 1, electrode support 19 bearing shaped electrodes 16 and 17 and associated electrical circuitry for applying a voltage to electrode 18 and shaped electrodes 16 and 17. The display embodiment of FIG. 3 is directed towards a display which advantageously utilizes the latent alignment image of the present invention to provide information of a constant or non-changing character together with variable information. For example, as depicted in FIG. 3, the display cell in directed towards a highway speed sign in which the speeds are selectively changed from 15 to 30 and the constant information provided in the form of a latent alignment image are the words "SPEED" and "MPH". Electrical switch S selectively connects a voltage source to either of shaped electrodes 16 or 17 which are in contact with liquid crystal composition film 8. The voltage source is electrically connected to electrode 18 uniformly deposited on the surface of substrate 1. Electrode 18 is in contact with the other side of liquid crystalline composition film 8. The latent alignment images 14 and 15 are created upon electrode 18 according to any of the aforementioned methods of treating a substrate and forming a latent alignment image thereon. In this case it will be appreciated that electrode 18 is the surface to be treated for the alignment of molecules in liquid crystalline composition film 8. All of the elements in FIG. 3 are transmissive to radiation from light source 11, in the light transmission mode of reading out the developed latent alignment images. Shaped electrodes 16 and 17 are utilized to provide an electrical field across, or an electrical current through, liquid crystalline composition film 8. Preferably, electrical field effects are utilized when liquid crystalline composition film 8 comprises a nematic liquid crystalline material. This is so because electrical fields tend to align nematic liquid crystalline materials either parallel to or perpendicular to the direction of the electrical field depending upon the electrical anisotropy of the nematic crystalline material. Nematic liquid crystalline materials having positive dielectric anisotropy typically align with the major axes of their molecules parallel to the applied electrical field whereas nematics having negative dielectric anisotropy typically align with the major axes of their molecules perpendicular to the direction of the applied electrical field. Preferably, of course, the dielectric anisotropy of the nematic liquid crystalline material utilized is such that the applied electrical field will orient the molecules of the nematic in a direction other than the molecular alignment direction in the background areas. That is, desirably, the molecules in the background areas are aligned in a first direction; the molecules in area of film 8 corresponding to the latent alignment images 14 and 15 are in a second direction and the alignment of the molecules in film 8 in the portion corresponding to shaped electrodes 16 and 17 are either in the second direction or in a third direction. If, for example, the nematic liquid crystalline material in the film 8 is aligned by treated electrode 18 homeotropically, then the nematic molecules in background areas will have their major axes perpendicular to the plane of electrode 18. The nematic should preferably have a negative dielectric anisotropy so that the application of an electrical field in the direction perpendicular to the plane of electrode 18 will result in aligning molecules in areas corresponding to electrodes 16 and 17 perpendicular to the electrical field direction and thus in a direction different than the molecular direction in background areas. Similarly, when electrode 18 is treated to align a nematic liquid crystalline material film 8 in the homogeneous direction, the molecules of the nematic in the background areas will be parallel to the plane of electrode 18. Accordingly, the nematic selected is desirably one having positive dielectric anisotropy so that the molecules in areas of film 8 corresponding to electrodes 16 and 17 will, when the electrical field is applied, be parallel to the direction of the applied field and therefore perpendicular to the plane of electrode 18. This will result in the molecules of film 8 in portions thereof corresponding to electrodes 16 and 17 having a direction that differs from the molecular direction of background portions of film 8. The foregoing is desirable in order to obtain an optical characteristic difference between image areas and background areas so that image areas, whether those of the latent alignment images or the electrical field created images, are visibly distinguishable from background areas.

The following Examples further specifically illustrate various preferred embodiments of the present invention. Parts and percentages are by weight unless otherwise indicated.

EXAMPLE I

A glass surface is rubbed with cotton in one direction. The rubbed surface is contacted with a xerographic copy which is placed on top of the rubbed glass without pressure, toner image in contact with the rubbed glass. A Xenon flash lamp is placed about two inches from the back side of the document. The energy supplied to the flash lamp is about 200 joules. After exposure, the xerographic copy is removed and the glass substrate is immersed in a solution of about 50% by weight MBBA and about 95% by weight petroleum ether. The glass is removed from solution and the solvent allowed to evaporate to leave a thin film of N-(p-methoxybenzilidene)-p-butylaniline (MBBA). The coated glass is placed between crossed polarizers such that the plane of polarization of one of the analyzers is aligned with the molecules of the MBBA in background areas. A white image is observed on a black background.

EXAMPLE II

The relief side of a bar of linotype is pressed against a glass surface rubbed as in Example I, and removed. Example I is followed to develop the latent alignment image. A white image on a dark background results.

EXAMPLE III

A Mylar surface is rubbed with cotton in one direction and contacted with the relief side of a rubber relief master. The master is removed and the Mylar is developed as in Example I. A white image on a dark background is observed between crossed polarizers.

EXAMPLE IV

Example I is repeated except that the developed image is rotated between crossed polarizers such that the molecular axis of the MBBA is not aligned with the polarization plane of either of the crossed polarizers. A dark image on a light background is observed.

EXAMPLE V

Example I is repeated except that prior to observation between two polarizers, a quarter-wave phase plate for red light is inserted between the MBBA and one of the polarizers. By rotating the sample, variously colored images and backgrounds were observed.

It will be appreciated that other variations and modifications will occur to those skilled in the art upon a reading of the present disclosure. These are intended to be within the scope of this invention. For example, a several microns thick layer of the liquid crystalline composition can be used to provide colored image and/or background areas without the use of phase plates.

What is claimed is:
1. A method of imaging comprising:
a. providing a uniformly treated substrate capable of aligning a liquid crystalline composition substantially uniformly in a first direction;
b. forming a latent alignment image on said treated substrate without removal of material therefrom; and
c. developing said latent alignment image by contacting said treated substrate with a liquid crystalline composition wherein background areas of the treated substrate align molecules of said liquid crystalline composition in said first direction and said latent alignment image of said substrate aligns molecules of said liquid crystalline composition in a second direction.

2. The method of claim 1 wherein said treated substrate comprises a rubbed substrate.

3. The method of claim 1 wherein said treated substrate comprises a substrate bearing a coating of aligning agent thereon.

4. The method of claim 1 further including the step of sandwiching said developed latent image between a polarizer and an analyzer, the planes of polarization of which are at about 90° with respect to one another.

5. The method of claim 4 wherein one of said polarizer and said analyzer has its plane of polarization in alignment with the orientation of molecules of said liquid crystalline composition in either the image or background areas.

6. The method of claim 1 wherein said liquid crystalline composition comprises a nematic liquid crystalline material.

7. The method of claim 1 wherein said liquid crystalline composition comprises a cholesteric liquid crystalline material.

8. The method of claim 1 wherein said liquid crystalline composition comprises a smectic liquid crystalline material.

9. A latently imaged member, comprising:
a. a uniformly treated substrate capable of aligning molecules of a liquid crystalline composition substantially uniformly in a first direction; and
b. a latent alignment image thereon capable of aligning molecules of said liquid crystalline composition in a second direction.

10. The member of claim 9 further including a film of liquid crystalline composition upon said treated substrate, the molecules of said liquid crystalline composition in areas corresponding to the background portions of said treated substrate having an alignment in a first direction and the molecules of said liquid alignment image having an alignment in a second direction.

11. The member of claim 9 wherein said treated substrate comprises a rubbed substrate.

12. The member of claim 9 wherein said treated substrate comprises a coating of aligning agent thereon.

13. The member of claim 9 further including a polarizer and an analyzer, said substrate and said liquid crystalline composition layer being sandwiched therebetween, wherein the planes of polarization of said polarizer and analyzer have an angle of about 90° therebetween.

14. The member of claim 13 wherein one of said polarizer and analyzer has its plane of polarization aligned with the molecular orientation of said liquid crystalline composition in either image or background areas.

15. The member of claim 9 wherein said liquid crystalline composition comprises a nematic liquid crystalline material.

16. The member of claim 9 wherein said liquid crystalline composition comprises a cholesteric liquid crystalline material.

17. The member of claim 9 wherein said liquid crystalline composition comprises a smectic liquid crystalline material.

18. The member according to claim 9 wherein said liquid crystalline composition layer has a thickness of between about 1 to about 100 microns.

19. The method of claim 1 further including the step of sandwiching said developed treated substrate between a polarizer and a circular polarizer.

20. The member of claim 9 further including a polarizer and a circular polarizer, said treated substrate and liquid crystalline composition layer being sandwiched therebetween.

21. The member of claim 10 wherein said treated substrate comprises an electrode, further including an electrode surface in imagewise configuration in contact with the other side of said film of liquid crystalline material.

22. The member of claim 21 further including crossed polarizers, wherein said member is sandwiched between said polarizers.

* * * * *